US012579996B1

(12) United States Patent
Fukuta

(10) Patent No.: US 12,579,996 B1
(45) Date of Patent: Mar. 17, 2026

(54) MAGNETIC DISK DEVICE AND CONTROLLING METHOD OF THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Kazuo Fukuta, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 19/060,883

(22) Filed: Feb. 24, 2025

(30) Foreign Application Priority Data

Sep. 18, 2024 (JP) ................................. 2024-161011

(51) Int. Cl.
| | |
|---|---|
| *G11B 5/54* | (2006.01) |
| *G11B 5/02* | (2006.01) |
| *G11B 5/60* | (2006.01) |
| *G11B 21/02* | (2006.01) |

(52) U.S. Cl.
CPC .............. *G11B 5/6011* (2013.01); *G11B 5/02* (2013.01); *G11B 21/02* (2013.01)

(58) Field of Classification Search
CPC ... G11B 5/54; G11B 5/59633; G11B 5/59688; G11B 20/20; G11B 5/55; G11B 5/5547; G11B 5/52
USPC .......................................................... 360/75
See application file for complete search history.

(56) References Cited

U.S. PATENT DOCUMENTS

| | | | |
|---|---|---|---|
| 5,777,815 A | 7/1998 | Kasiraj et al. | |
| 7,110,224 B2 | 9/2006 | Nakamura et al. | |
| 7,190,547 B2 | 3/2007 | Khurshudov et al. | |
| 11,189,305 B2 * | 11/2021 | Tomoda ................ | G11B 5/312 |
| 11,749,303 B2 | 9/2023 | Byoun et al. | |

FOREIGN PATENT DOCUMENTS

JP       2023199960 A       11/2023

OTHER PUBLICATIONS

Kenichiro Aoki, U.S. Appl. No. 18/625,413, filed Apr. 3, 2024, corresponds to FP No. 1.

* cited by examiner

*Primary Examiner* — Nabil Z Hindi
(74) *Attorney, Agent, or Firm* — Maier & Maier, PLLC

(57) ABSTRACT

According to one embodiment, a magnetic disk device comprising a magnetic disk, a magnetic head, a first actuator, a second actuator, a detection section which detects a flying amount of the magnetic head to the magnetic disk, and a controller which controls drive of the first actuator and drive of the second actuator.

6 Claims, 10 Drawing Sheets

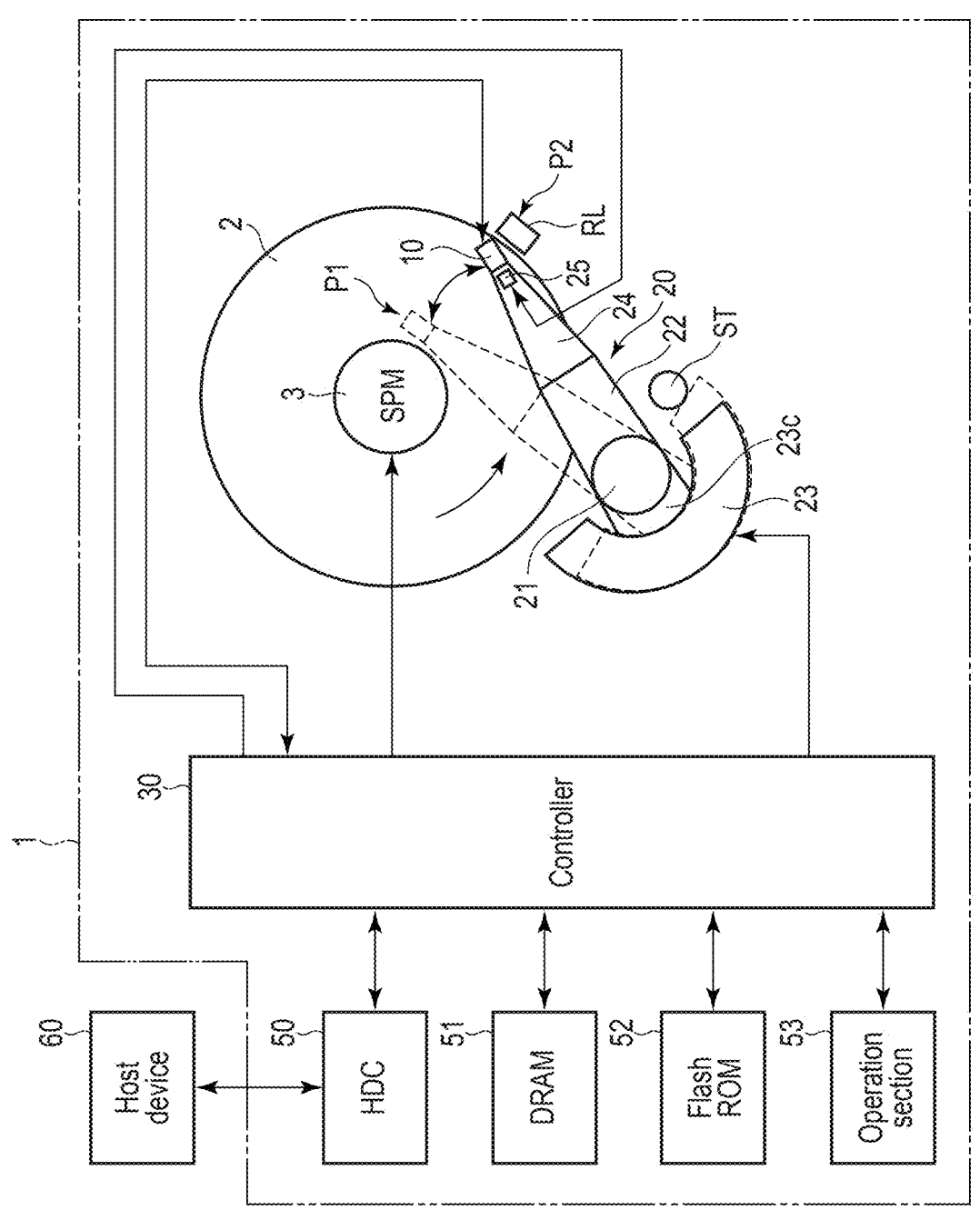
F I G. 1

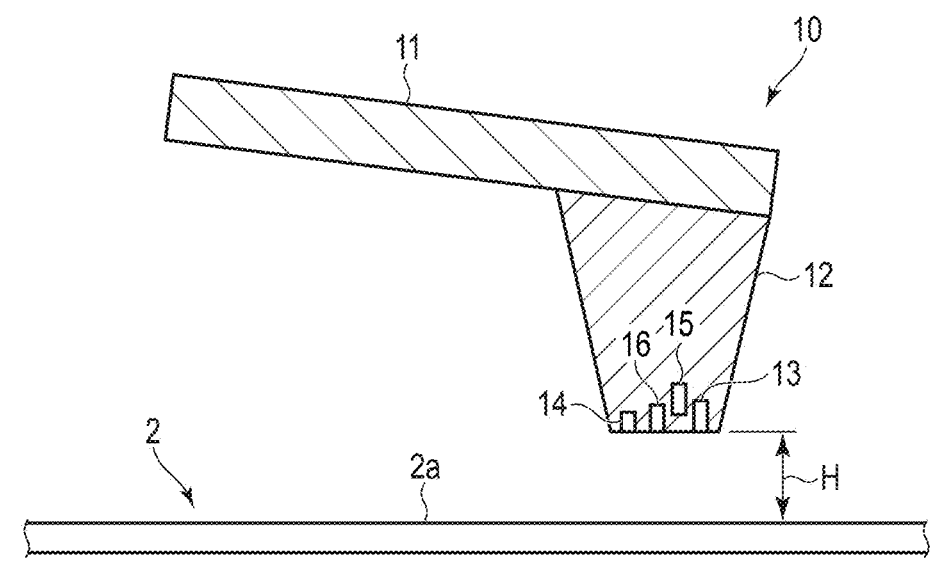
F I G. 2

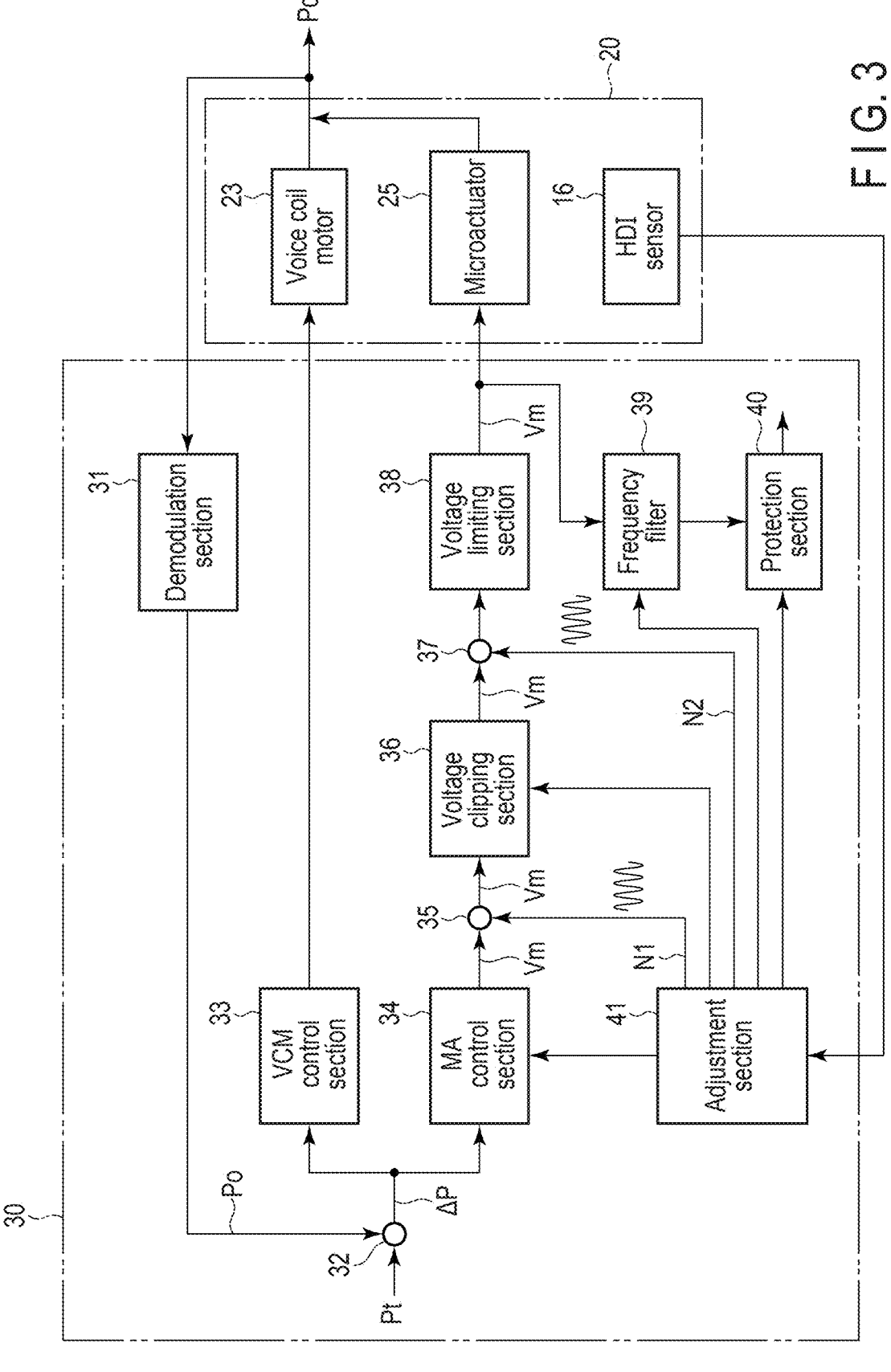
F I G. 3

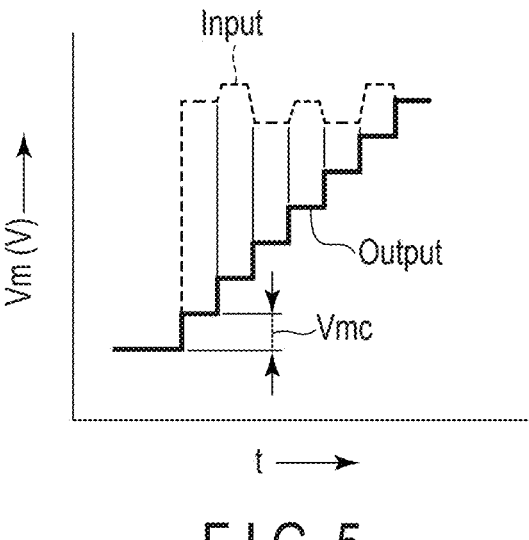
F I G. 5
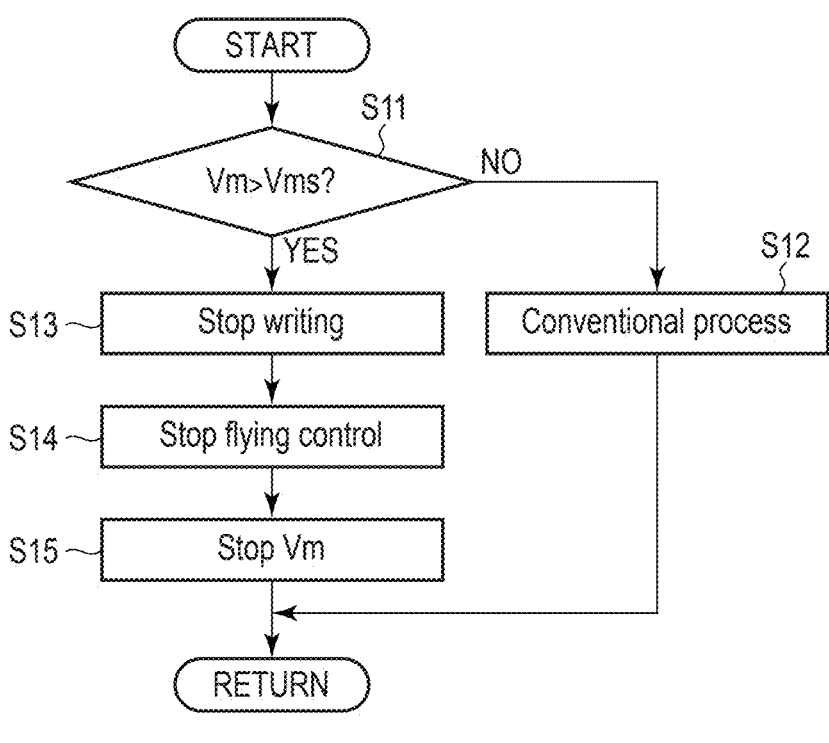
F I G. 6

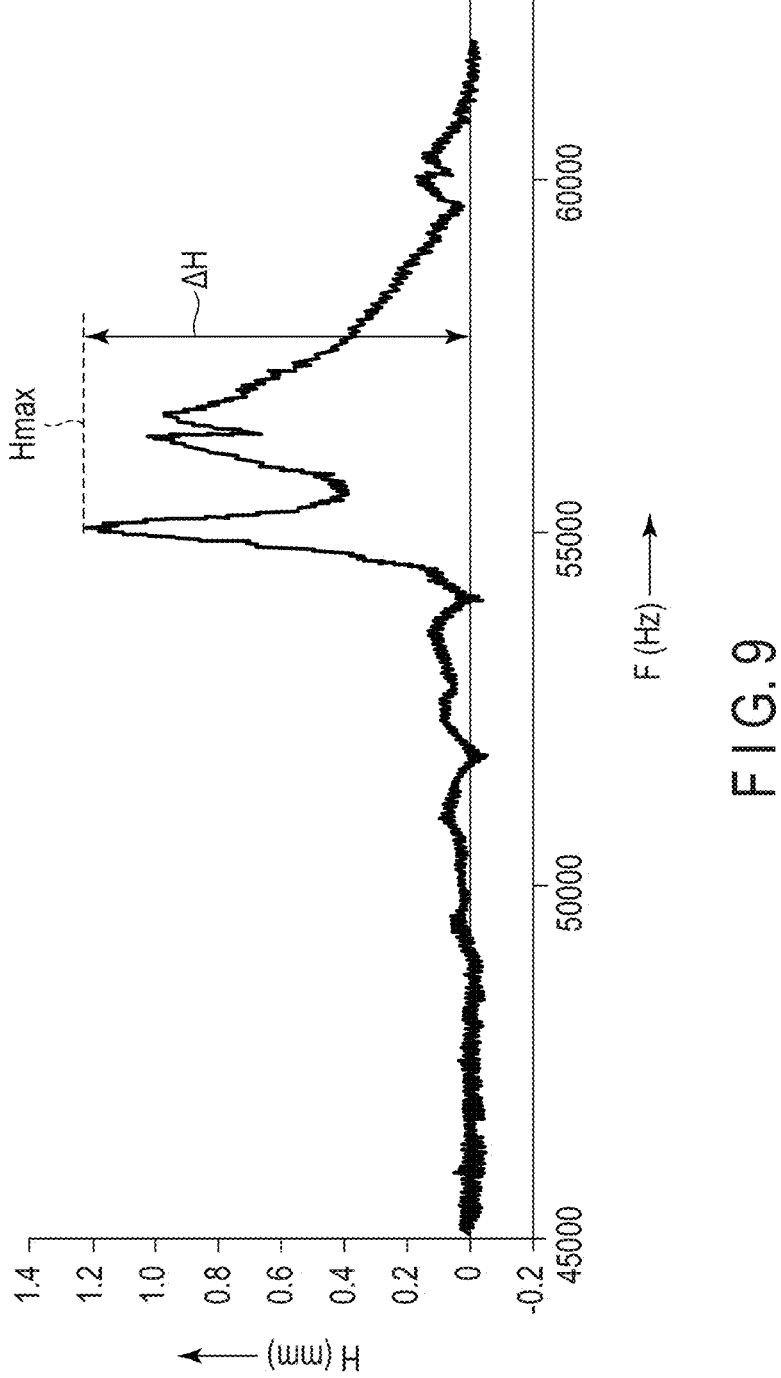
F I G. 9

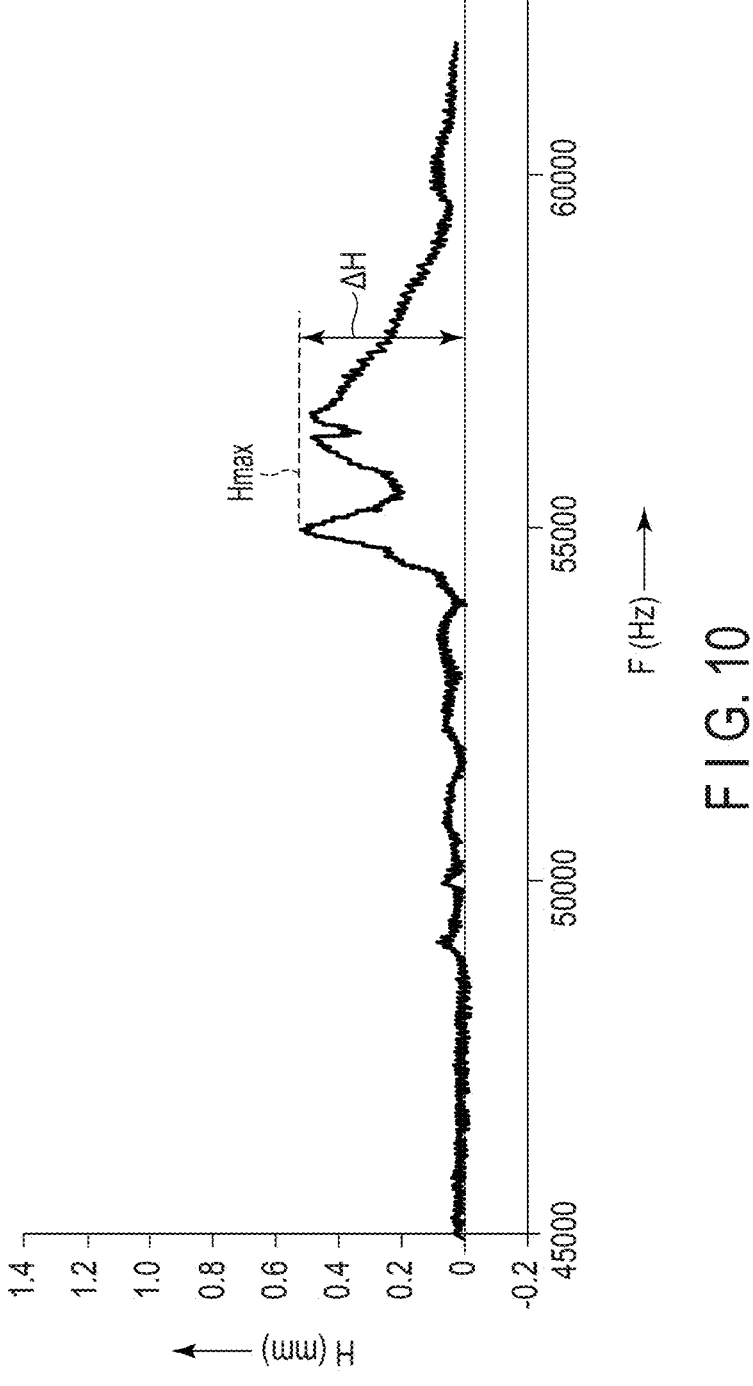
F I G. 10

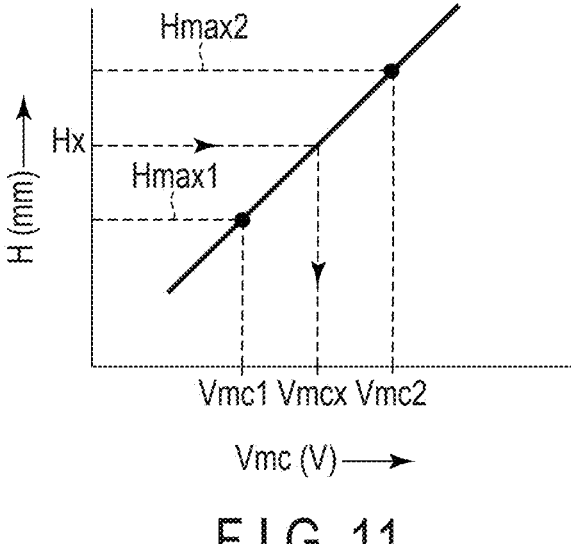
F I G. 11
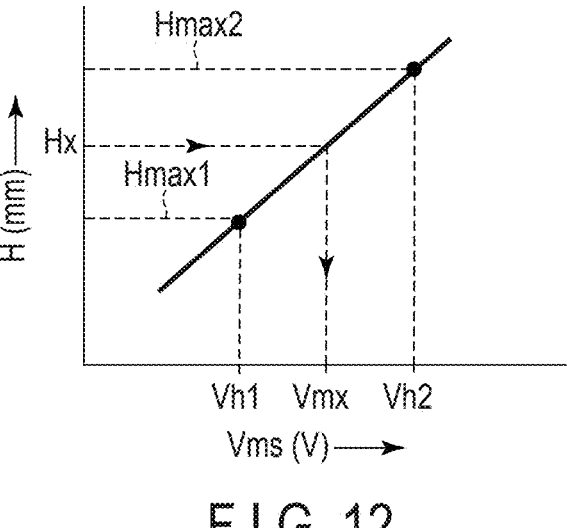
F I G. 12

MAGNETIC DISK DEVICE AND CONTROLLING METHOD OF THE SAME

CROSS-REFERENCE TO RELATED APPLICATIONS

This application is based upon and claims the benefit of priority from Japanese Patent Application No. 2024-161011, filed Sep. 18, 2024, the entire contents of which are incorporated herein by reference.

FIELD

Embodiments described herein relate generally to a magnetic disk device comprising a magnetic disk and a magnetic head, and a controlling method of the same.

BACKGROUND

A magnetic disk device comprises a magnetic disk, a magnetic head and an actuator which seeks (moves) the magnetic head in the radial direction of the magnetic disk, and seeks the magnetic head from a previous stop position to a target position (write position or read position) on the magnetic disk when writing data to or reading data from the magnetic disk.

The actuator includes a voice coil motor for drive, and comprises a microactuator which causes the magnetic head to be finely displaced in the radial direction of the magnetic disk in order to compensate for the accuracy of the seek caused by the drive of the voice coil motor.

If the drive voltage to the microactuator suddenly changes, a large fluctuation occurs in the flying amount of the magnetic head (referred to as "spacing") for the magnetic disk. In addition, if high frequency noise or the like caused by external disturbances is superimposed on a drive voltage to the microactuator, fluctuations unnecessary for the flying amount of the magnetic head may occur. Such fluctuations in the flying amount of the magnetic head is different in each magnetic disk device and each magnetic head.

BRIEF DESCRIPTION OF THE DRAWINGS

FIG. 1 is a view showing an overall configuration of an embodiment.

FIG. 2 is a view showing a cross-section of main portions of a magnetic head according to the embodiment.

FIG. 3 is a block diagram showing main portions of a controller according to the embodiment.

FIG. 5 is a graph showing the change in drive voltage Vm input to the voltage clipping section and the change in drive voltage Vm output from the voltage clipping section, in the embodiment.

FIG. 6 is a flowchart showing the control of a protection section in the embodiment.

FIG. 9 is a graph showing a relationship between a frequency of a high frequency signal and the flying amount of the magnetic head in a case where a voltage clip value Vmc is set to a test value Vmc2 and the high frequency signal is superimposed on the drive voltage Vm in the embodiment.

FIG. 10 is a graph showing a relationship between a frequency of a high frequency signal and the flying amount of the magnetic head in a case where a voltage clip value Vmc is set to a test value Vmc1 (<Vmc2) and the high frequency signal is superimposed on the drive voltage Vm in the embodiment.

FIG. 11 is a graph showing an approximate curve indicating the flying amount of the magnetic head in a case where the voltage clip value Vmc is the test values Vmc1 and Vmc2 in the embodiment.

FIG. 12 is a graph showing an approximate curve indicating the flying amount of the magnetic head in a case where the voltage amplitude value of the high frequency signal N2 is the test values Vh1 and Vh2 in the embodiment.

DETAILED DESCRIPTION

Figure 4:
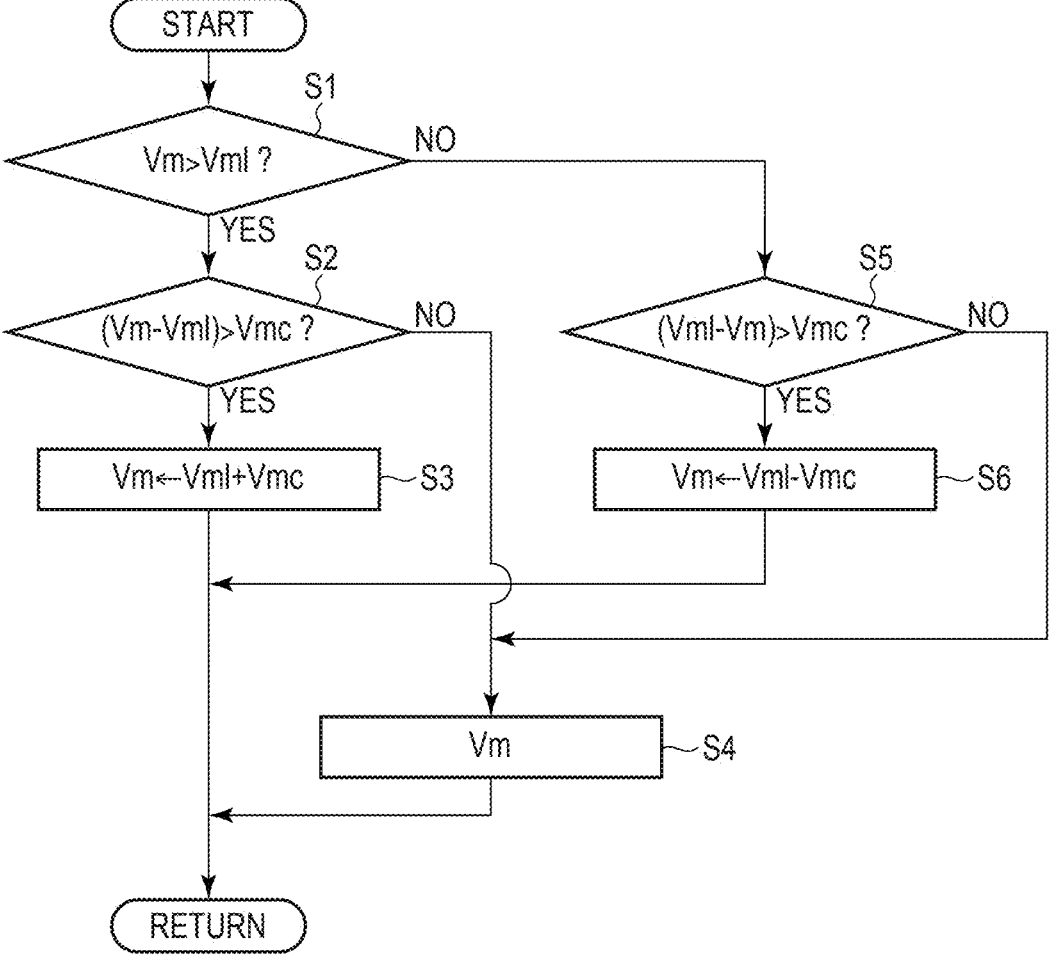
FIG. 4 is a flowchart showing the control of a voltage clipping section in the embodiment.

In general, according to one embodiment, a magnetic disk device includes a magnetic disk; a magnetic head which writes data to and reads data from the magnetic disk; a first actuator which causes the magnetic head to seek in a radial direction of the magnetic disk; a second actuator which causes the magnetic head to be finely displaced in the radial direction of the magnetic disk; a detection section which detects a flying amount of the magnetic head to the magnetic disk; and a controller which controls drive of the first actuator and drive of the second actuator. The controller includes a first control section which outputs and controls a drive voltage to the first actuator to cause the magnetic head to seek to a target position on the magnetic disk, a second control section which outputs and controls a drive voltage to the second actuator to finely adjust the position of the magnetic head at the target position on the magnetic disk, a voltage clipping section which changes the drive voltage to the second actuator, which is output from the second control section, in stages by a predetermined voltage clip value, and an adjustment section which detects fluctuation in the flying amount detected by the detection section while superimposing a high frequency signal on the drive voltage to the second actuator, which is output from the second control section, and sets the predetermined voltage clip value of the voltage clipping section based on detection results.

One embodiment will be described hereinafter with reference to the accompanying drawings.

As shown in FIG. 1, a magnetic disk device 1 includes a magnetic disk 2 serving as a recording medium, a spindle motor 3 which drives rotation of the magnetic disk 2, and a magnetic head 10 which writes and reads data to and from the magnetic disk 2. An actuator (first actuator) 20 which seeks the magnetic head 10 in a radial direction is provided near the magnetic disk 2.

The actuator 20 is also referred to as an actuator block or head stack assembly (HSA), and includes a rotation shaft 21, an arm 22 having a middle part held on the rotation shaft 21, a voice coil motor (VCM) 23 provided at a proximal end of the arm 22, and a suspension member 24 provided at the distal end of the arm 22 to hold the magnetic head 10.

The voice coil motor 23 rotates the actuator 20 between a first position P1 represented by a broken line in the figure and a second position P2 represented by a solid line in the figure, by being supplied with a drive voltage. In accordance with the rotation of the actuator 20 rotates, the magnetic head 10 seeks (moves) in the radial direction of the magnetic disk 2.

A stopper ST and a ramp mechanism RL are provided near the actuator 20. The stopper ST limits the moving position of the magnetic head 10 on the inner circumferential side of the magnetic disk 2. The ramp mechanism RL saves the magnetic head 10 from a position above the magnetic disk 2 when the spindle motor 3 is stopped.

In addition, the actuator 20 comprises a microactuator (MA; second actuator) 25 on the suspension member 24 to compensate for the accuracy of the seek driven by the voice coil motor 23. The microactuator 25 includes a pair of piezoelectric elements arranged along the radial direction of the magnetic disk 2, and finely displaces the magnetic head 10 in the radial direction of the magnetic disk 2 by the drive of the piezoelectric elements.

The magnetic disk device 1 includes a controller 30 which serves as the control center, a DRAM 51 which stores the programs and the like necessary for control of the controller 30, a flash ROM 52 which is a memory storing various data necessary for control of the controller 30, an operation unit 53, a hard disk controller (HDC) 50 provided between the controller 30 and an external host device 60.

As shown in FIG. 2, the magnetic head 10 includes a slider 11 at its distal end, and includes a head element 12 on the lower surface side of the slider 11 (i.e., the side facing the magnetic disk 2). A plurality of servos having track information and positioning information written thereto are provided at regular intervals around the circumference of the magnetic disk 2, and the space between these servos is used as data area. When the magnetic disk 2 is rotated, the slider 11 flies by the wind pressure from its rotation, and causes the magnetic head 10 to fly in the direction of being separated from the magnetic disk 2.

The head element 12 includes a write element 13 which writes magnetic data to the magnetic disk 2, a read element 14 which reads magnetic data from the magnetic disk 2, an electric heater (simply referred to as a heater) 15 for generating heat, and a spacing sensor (detection section; also referred to as an HDI sensor) 16 which detects the flying amount (also referred to as spacing) H of the magnetic head 10 relative to the surface 2a of the magnetic disk 2. The write element 13 and the read element 14 are provided on the lower surface of the head element 12 so as to be exposed.

When the magnetic disk 2 is rotated, the magnetic head 10 flies in a direction of separating from the surface 2a of the magnetic disk 2 by the action of the slider 11. In order to realize high density recording on the magnetic disk 2, it is necessary to reduce the flying amount H of the magnetic head 10 and make the magnetic head 10 as close as possible to the surface 2a of the magnetic disk 2.

The controller 30 controls supply of power to the electric heater 15 of the head element 12 while detecting the flying height H of the magnetic head 10 by the spacing sensor 16. As a result, the electric heater 15 generates heat and the head element 12 thermally expands towards the magnetic disk 2 due to the generated heat. This thermal expansion causes the write element 13 and read element 14 to protrude towards the magnetic disk 2 and approach the surface 2a of the magnetic disk 2. The spacing sensor 16 is a resistance element whose electrical resistance value changes in accordance with the ambient temperature, and detects the change in electrical resistance value caused by the temperature change of the head element 12 as the flying amount H.

In addition, as shown in FIG. 3, the controller 30 includes a demodulation section 31 which demodulates a position Po of the magnetic head 10 on the magnetic disk 2 from the read data of the magnetic head 10, a differential detection section 32 which detects a difference ΔP between the position Po demodulated by the demodulation section 31 and a target position Pt of the seek, and a VCM control section (first control section) 33 and an MA control section (second control section) 34 to which the difference ΔP detected by the difference detection section 32 is input.

The VCM control section 33 outputs and controls the drive voltage to the voice coil motor 23 of the actuator 20 in order to seek the magnetic head 10 to the target position Pt on the magnetic disk 2.

The MA control section 34 outputs and controls a drive voltage Vm to the microactuator 25 in order to finely adjust the position of the magnetic head 10 at the target position on the magnetic disk 2.

Furthermore, the controller 30 includes a superimposition section 35, a voltage clipping section 36, a superimposition section 37, a voltage limiting section 38, a frequency filter 39, a protection section 40, and an adjustment section 41.

The superimposition section 35 superimposes high frequency signals (first high frequency signals) N1 output by the adjustment section 41 on the drive voltage Vm output from the MA control section 34 to the microactuator 25. Superimposing the high frequency signal N1 is also referred to as excitation.

The voltage clipping section 36 changes the drive voltage Vm for the microactuator 25 output from the MA control section 34 in stages by a predetermined voltage clip value Vmc. The control of the voltage clipping section 36 is shown in the flowchart of FIG. 4, and the change in the drive voltage Vm input to the voltage clipping section 36 and the change in the drive voltage Vm output from the voltage clipping section 36 are shown in FIG. 5.

In other words, the voltage clipping section 36 determines whether or not the drive voltage Vm output from the MA control section 34 is larger than a previous value Vml (S1). If the drive voltage Vm is larger than the previous value Vml (YES in S1), the voltage clipping section 36 determines whether difference "Vm−Vml" between the drive voltage Vm and the previous value Vml is larger than the voltage clip value Vmc (S2).

If the difference "Vm−Vml" is larger than the voltage clip value Vmc (YES in S2), the voltage clipping section 36 outputs the drive voltage Vm, which is the value obtained by adding the voltage clip value Vmc to the previous value Vml (S3). If the difference "Vm−Vml" is smaller than or equal to the voltage clip value Vmc (NO in S2), the voltage clipping section 36 outputs the drive voltage Vm output from the MA control section 34 as it is (S4).

If the drive voltage Vm is the same as or smaller than the previous value Vml (NO in S1), the voltage clipping section 36 determines whether difference or not the difference "Vml−Vm" between the previous value Vml and the drive voltage Vm is larger than the voltage clip value Vmc (S5).

If the difference "Vml−Vm" is larger than the voltage clip value Vmc (YES in S5), the voltage clipping section 36 outputs the drive voltage Vm, which is the value obtained by subtracting the voltage clip value Vmc from the previous value Vml (S6). If the difference "Vml−Vm" is smaller than or equal to the voltage clip value Vmc (NO in S5), the voltage clipping section 36 outputs the drive voltage Vm output from the MA control section 34 as it is (S4).

Even if the drive voltage Vm to the microactuator 25, which is output from the MA control section 34, suddenly changes, fluctuations in the flying amount H of the magnetic head 10 caused by the change can be prevented by adopting the voltage clipping section 36.

The drive voltage Vm output from the voltage clipping section 36 is supplied to the voltage limiting section 38 via the superimposition section 37. The voltage limiting section 38 limits the drive voltage Vm to a value smaller than or equal to a specified value such that an excessive voltage is not applied to the microactuator 25. The drive voltage Vm that has passed through the voltage limiting section 38 is supplied to the microactuator 25.

The drive of this microactuator 25 is added to the drive of the voice coil motor 23 executed by the VCM control section 33, and the position Po of the magnetic head 10 on the magnetic disk 2 is thereby determined. The position Po of the magnetic head 10 is fed back to the difference detection section 32 via the demodulation section 31.

The superimposition section 37 superimposes high frequency signals (second high frequency signals) N2 output by the adjustment section 41 on the drive voltage Vm output from the voltage clipping section 36. Superimposing the high frequency signal N2 is also referred to as excitation.

When a test mode is set by the operation of the operator's operation unit 53 in the manufacturing process of the magnetic disk drive 1, the adjustment section 41 causes the MA control section 34 to output a predetermined value of the drive voltage Vm, measures the fluctuation in the flying amount H detected by the spacing sensor 16 while superimposing a sinusoidal high frequency signal N1 having a predetermined voltage amplitude value on the drive voltage Vm via the superimposition section 35, and sets the voltage clip value Vmc of the voltage clipping section 36 based on the measurement results.

The adjustment section 41 includes the following sections (1) to (4) as its main functions related to setting of the voltage clip value Vmc.

(1) First setting section which sequentially sets the voltage clip value Vmc of the voltage clipping section 36 to a plurality of test values (for example, two test values Vmc1 and Vmc2) when setting the above-described test mode.

(2) First detection section which sequentially detects the maximum value (with a large fluctuation range ΔH) Hmax of the flying amount H detected by the spacing sensor 16, while superimposing the high frequency signal N1 on the drive voltage Vm output from the MA control section 34 and changing the frequency of the high frequency signal N1 for each setting of the test values set by the above-described first setting section.

(3) First generation section which generates an approximate curve (first approximate curve) that expresses the relationship between each test value set in the above-described first setting section and each maximum value Hmax detected in the above-described first detection section.

(4) Second setting section which obtains the voltage clip value Vmcx corresponding to the allowable value Hx of the fluctuation of the flying amount H of the magnetic head 10 from the approximate curve generated in the above-described first generation section, and sets (confirms) the obtained voltage clip value Vmcx as the voltage clip value Vmc of the voltage clipping section 36 in the manufactured magnetic disk device 1.

The frequency filter 39 extracts the drive voltage Vm of the frequency range including the frequency of the high frequency signal N1 when the maximum value Hmax of the flying amount H is detected in the adjustment section 41, from the drive voltages Vm that have passed through the voltage limit section 38.

The protection section 40 stops the write of the magnetic head 10 and the drive of the microactuator 25 when the drive voltage Vm extracted by the frequency filter 39 exceeds the threshold value Vms (fail-safe function).

More specifically, the protection section 40 determines whether or not the drive voltage Vm extracted by the frequency filter 39 exceeds the threshold value Vms, as shown in the flowchart of FIG. 6 (S11). If the drive voltage Vm does not exceed the threshold value Vms (NO in S11), the protection section 40 executes a conventional process without protective operation (S12). However, if the drive voltage Vm exceeds the threshold value Vms (YES in S11), the protection section 40 stops writing the data, which is executed using the write element 13 of the magnetic head 10 (S13), stops the flying amount control of the magnetic head 10, which is executed using the heat generated by the magnetic head 15 (S14), and stops output of the drive voltage Vm of the MA control section 34 to stop the drive of the microactuator 25 (S15), as the fail-safe measure of safety protection. After executing the fail-safe measure, the protection section 40 returns to the above-described determination in S11.

Furthermore, the adjustment section 41 includes the following sections (5) to (9) as the main functions related to the frequency filter 39 and the protection section 40 when setting the above-described test mode.

(5) Third setting section which sets the frequency range of the high frequency signal (first high frequency signal) N1 in which the maximum value Hmax of the flying amount H is generated, as the frequency range which is to be a target of extraction of the frequency filter 39, after the setting process of the above-described second setting section.

(6) Fourth setting section which outputs the sinusoidal high frequency signal (second high frequency signal) N2 from the adjustment section 41 and sequentially sets the voltage amplitude value of the high frequency signal N2 to a plurality of test values (for example, two test values Vh1 and Vh2), after the setting process of the above-described third setting section.

(7) Second detection section which detects the maximum value Hmax of the flying amount H detected by the spacing sensor 16, while superimposes the high frequency signal N2 on the drive voltage Vm output from the voltage clipping section 36 and changing the frequency of the high frequency signal N2 for each setting of the test values set by the above-described fourth setting section.

(8) Second generation section which generates an approximate curve (second approximate curve) that expresses the relationship between each test value set in the above-described third setting section and each maximum value Hmax detected in the above-described second detection section.

(9) Fifth setting section which obtains the value Vmx of the drive voltage Vm corresponding to the allowable value Hx of the fluctuation of the flying amount H of the magnetic head 10 from the approximate curve generated in the above-described second generation section, and sets (confirms) the obtained value Vmx as the threshold value Vms of the protection section in the manufactured magnetic disk device 1.

Figure 7:
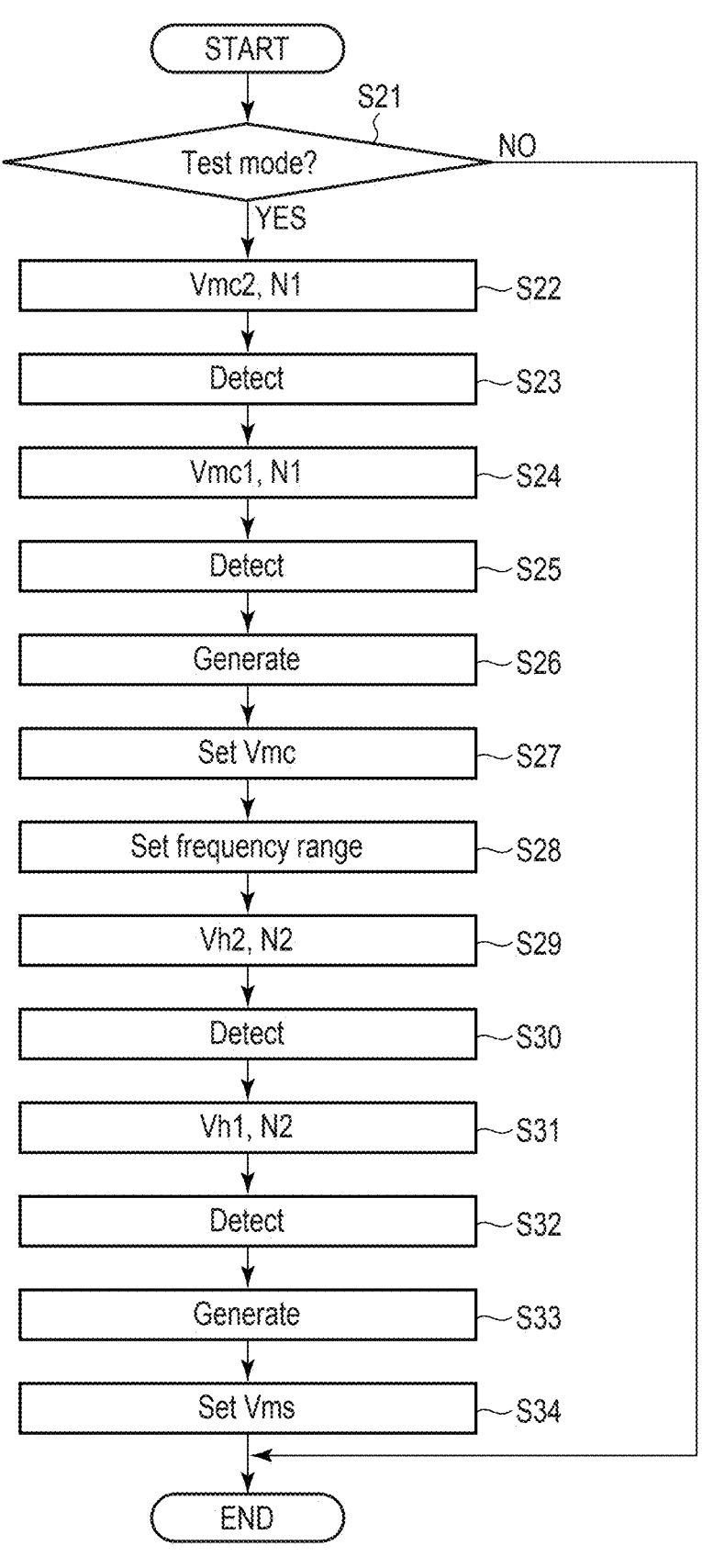
FIG. 7 is a flowchart showing the control of an adjustment section in the embodiment.

The control executed by the adjustment section 41 will be described with reference to a flowchart in FIG. 7.

In the manufacturing process of the magnetic disk device 1, an operator sets the test mode for the adjustment section 41 by operating the operation unit 53.

Figure 8:
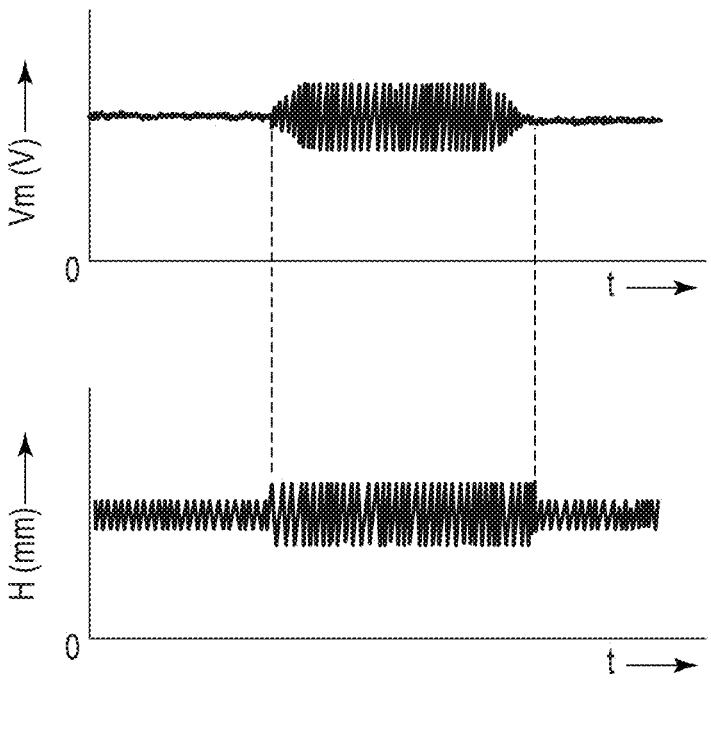
FIG. 8 is a chart showing the fluctuation in the flying amount of the magnetic head in a case where a high frequency signal overlaps with drive voltage Vm in the embodiment.

When the test mode is set (YES in S21), the adjustment section 41 first sets the voltage clip value Vmc of the voltage clipping section 36 to the test value (initial value for testing) Vmc2, and superimposes the sinusoidal high frequency signal N1 having a predetermined voltage amplitude value on the drive voltage Vm output from the MA control section 34 (S22). Fluctuations occur in the flying amount H of the magnetic head 10 by the superimposition of the high-frequency signal N1, as shown in FIG. 8.

Then, the adjustment section 41 detects the maximum value (large fluctuation range ΔH) Hmax2 of the flying amount H detected by the spacing sensor 16 while changing the frequency of the superimposed high frequency signal N1 over a wide range as shown in FIG. 9 (S23). In the example shown in FIG. 9, the flying amount H fluctuates largely when the high frequency signal N1 is in the frequency range of approximately 54,000 Hz to 60,000 Hz, and the maximum value Hmax2 of the flying amount H exists at approximately 55,000 Hz.

Next, the adjustment section 41 sets the voltage clip value Vmc of the voltage clipping section 36 to the test value Vmc1, which is, for example, a value of 60% of the test value Vmc2, and superimposes the sinusoidal high frequency signal N1 having a predetermined voltage amplitude value on the drive voltage Vm output from the MA control section 34 in the same manner as described above (S24). Fluctuations occur in the flying amount H of the magnetic head 10 by the superimposition of the high-frequency signal N1, as shown in FIG. 8.

Then, the adjustment section 41 detects the maximum value (large fluctuation range ΔH) Hmax1 of the flying amount H detected by the spacing sensor 16 while changing the frequency of the superimposed high frequency signal N1 over a wide range as shown in FIG. 10 (S25). In the example shown in FIG. 10 as well, the flying amount H fluctuates largely when the high frequency signal N1 is in the frequency range of approximately 54,000 Hz to 60,000 Hz, and the maximum value Hmax1 of the flying amount H exists at approximately 55,000 Hz.

After detecting the maximum values Hmax2 and Hmax1, the adjustment section 41 generates an approximate curve shown in FIG. 11, which expresses the relationship between the above-described set test values Vmc2 and Vmc1 and the above-described detected maximum values Hmax2 and Hmax1 (S26).

Then, the adjustment section 41 obtains the voltage clip value Vmcx corresponding to the allowable value Hx of the fluctuation of the flying amount H of the magnetic head 10 from the approximate curve generated in the above-described S26, and sets (confirms) the obtained voltage clip value Vmcx as the voltage clip value Vmc of the voltage clipping section 36 in the manufactured magnetic disk device 1 (S27).

In other words, the voltage clip value Vmc is reduced in the magnetic disk device 1 and the magnetic head 10 where the fluctuation range ΔH of the flying height H is likely to become large, and conversely, the voltage clip value Vmc is not suppressed unnecessarily in the magnetic disk device 1 and the magnetic head 10 where the fluctuation range ΔH of the flying height H is not likely to become large.

After that, this voltage clip value Vmc is stored in the voltage clipping section 36 as information specific to the magnetic disk device 1 and the magnetic head 10.

Thus, by setting the voltage clip value Vmc of the voltage clipping section 36 after confirming the fluctuation in the flying height H caused by superimposition of high frequency noise, or the like, unnecessary fluctuation in the floating height H of the magnetic head 10 can be suppressed even if the high frequency noise is superimposed on the drive voltage Vm output from the MA control section 34.

After the voltage clip value Vmc in S27 is set, the adjustment section 41 sets the frequency range of the high frequency signal N1 in which the above-described maximum values Hmax2 and Hmax1 are produced, as the frequency range which is to be the target of extraction of the frequency filter 39 (S28). After that, this frequency range is stored in the frequency filter 39 as information specific to the magnetic disk device 1 and the magnetic head 10. By setting this frequency range, the drive voltage Vm of the frequency range, which leads to large fluctuation in the flying amount H can be accurately extracted by the frequency filter 39.

Next, the adjustment section 41 superimposes a sinusoidal high frequency signal N2 having a voltage amplitude value set to the test value Vh2 on the drive voltage Vm output from the voltage clipping section 36 (S29).

Then, the adjustment section 41 detects the maximum value Hmax2 of the flying amount H detected by the spacing sensor 16 while changing the frequency of the superimposed high frequency signal N2 in the same manner as that shown in FIG. 9 (S30).

Next, the adjustment section 41 superimposes a sinusoidal high frequency signal N2 having the voltage amplitude value set to the test value Vh1 (<Vh2) on the drive voltage Vm output from the voltage clipping section 36 (S31).

Then, the adjustment section 41 detects the maximum value Hmax1 of the flying amount H detected by the spacing sensor 16 while changing the frequency of the superimposed high frequency signal N2 in the same manner as that shown in FIG. 10 (S32).

After detecting the maximum values Hmax2 and Hmax1, the adjustment section 41 generates an approximate curve as shown in FIG. 12, which expresses the relationship between the above-described set test values Vh2 and Vh1 and the above-described detected maximum values Hmax2 and Hmax1 (S33).

Then, the adjustment section 41 obtains the value Vmx of the drive voltage Vm corresponding to the allowable value Hx of the fluctuation of the flying amount H of the magnetic head 10 from the approximate curve generated in the above-described S33, and sets (confirms) the obtained value Vmx of the drive voltage Vm as the threshold value Vms of the protection section 40 in the manufactured magnetic disk device 1 (S34). After that, this threshold value Vms is stored in the protection section 40 as information specific to the magnetic disk device 1 and the magnetic head 10.

Thus, by setting the threshold value Vms of the protection section after confirming the fluctuation in the drive voltage Vm caused by superimposition of high frequency noise, or the like, write abnormality of the magnetic head 10, abnormal drive of the microactuator 25, and the like, which are caused by the influence of the high frequency noise and the like can be avoided.

In the above-described embodiment, two test values Vmc2 and Vmc1 are set as the test values of the clip voltage value Vmc, and two test values Vh2 and Vh1 are set as the test values for the high frequency signal N2, but the number of these test values is not limited but can be set as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

9

10

What is claimed is:

1. A magnetic disk device comprising:

a magnetic disk;

a magnetic head which writes data to and reads data from the magnetic disk;

a first actuator which causes the magnetic head to seek in a radial direction of the magnetic disk;

a second actuator which causes the magnetic head to be finely displaced in the radial direction of the magnetic disk;

a detection section which detects a flying amount of the magnetic head to the magnetic disk; and a controller which controls drive of the first actuator and drive of the second actuator, wherein the controller includes a first control section which outputs and controls a drive voltage to the first actuator to cause the magnetic head to seek to a target position on the magnetic disk, a second control section which outputs and controls a drive voltage to the second actuator to finely adjust the position of the magnetic head at the target position on the magnetic disk, a voltage clipping section which changes the drive voltage to the second actuator, which is output from the second control section, in stages by a predetermined voltage clip value, and an adjustment section which detects fluctuation in the flying amount detected by the detection section while superimposing a high frequency signal on the drive voltage to the second actuator, which is output from the second control section, and sets the predetermined voltage clip value of the voltage clipping section based on detection results.

2. The device according to claim 1, wherein the adjustment section sequentially sets a voltage clip value of the voltage clipping section to a plurality of test values when setting a test mode, detects a maximum value of a flying amount detected by the detection section, while superimposing a first high frequency signal on a drive voltage output from the second control section to the second actuator and changing a frequency of the first high frequency signal, for each setting of the test values, generates a first approximate curve of each of the detected maximum values, and obtains the voltage clip value corresponding to the allowable value of the fluctuation of the flying amount from the generated first approximate curve, and sets the obtained voltage clip value as a voltage clip value of the voltage clipping section.

3. The device according to claim 2, further comprising:

a frequency filter which extracts a drive voltage of a predetermined frequency range among drive voltages output from the voltage clipping section to the second actuator, and a protection section which stops write of the magnetic head and drive of the second actuator when the drive voltage extracted by the frequency filter exceeds a threshold value.

4. The device according to claim 3, wherein the adjustment section sets the frequency range of the first high frequency signal in which the maximum value of the flying amount is generated, as a frequency range which is to be a target of extraction of the frequency filter, outputs a second high frequency signal from the adjustment section and sequentially sets a voltage amplitude value of the second high frequency signal to a plurality of test values, detects a maximum value of a flying amount detected by the detection section, while superimposing the second high frequency signal on a drive voltage output from the voltage clipping section to the second actuator and changing a frequency of the second high frequency signal, for each setting of the test values, generates an approximate curve of each of the detected maximum values, and obtains a value of the drive voltage to the second actuator corresponding to the allowable value of the fluctuation of the flying amount from an approximate curve of each of the detection results, and set the obtained value as a threshold value of the protection section.

5. The device according to claim 1, wherein the first actuator includes a voice coil motor, and causes the magnetic head to seek in a radial direction of the magnetic disk by drive of the voice coil motor, and the second actuator includes a piezoelectric element, and causes the magnetic head to be finely displaced in a radial direction of the magnetic disk by drive of the piezoelectric element.

6. A method of controlling a magnet disk device comprising a magnetic disk; a magnetic head which writes data to and reads data from the magnetic disk; a first actuator which causes the magnetic head to seek in a radial direction of the magnetic disk; a second actuator which causes the magnetic head to be finely displaced in the radial direction of the magnetic disk; and a detection section which detects a flying amount of the magnetic head to the magnetic disk:

the method comprising:

outputting and controlling a drive voltage to the first actuator to cause the magnetic head to seek to a target position on the magnetic disk;

outputting and controlling a drive voltage to the second actuator to finely adjust the position of the magnetic head at the target position on the magnetic disk;

changing the drive voltage to the second actuator, in stages by a predetermined voltage clip value, and detecting fluctuation in the flying amount detected by the detection section while superimposing a high frequency signal on the drive voltage to the second actuator, and setting the predetermined voltage clip value of the voltage clipping section based on detection results.

* * * * *